Dec. 23, 1969 P. EVANS 3,485,366
FILTER AND METHOD OF FILTERING
Filed Aug. 29, 1967 3 Sheets-Sheet 1
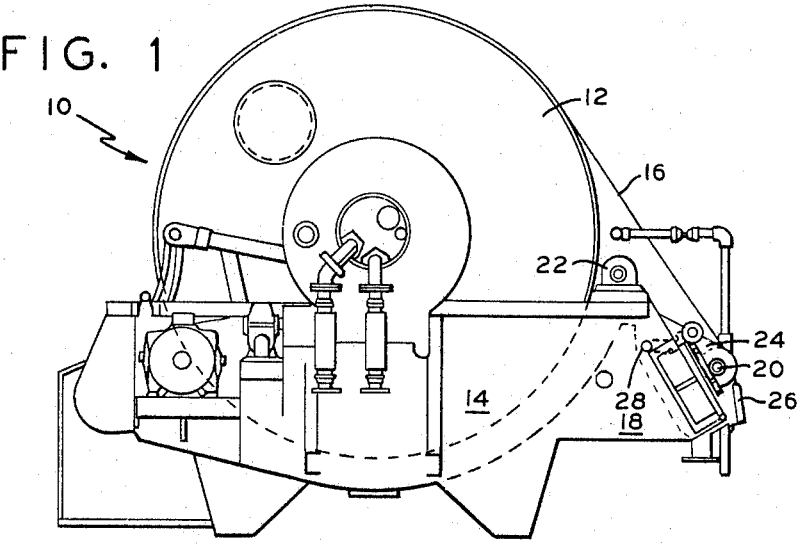
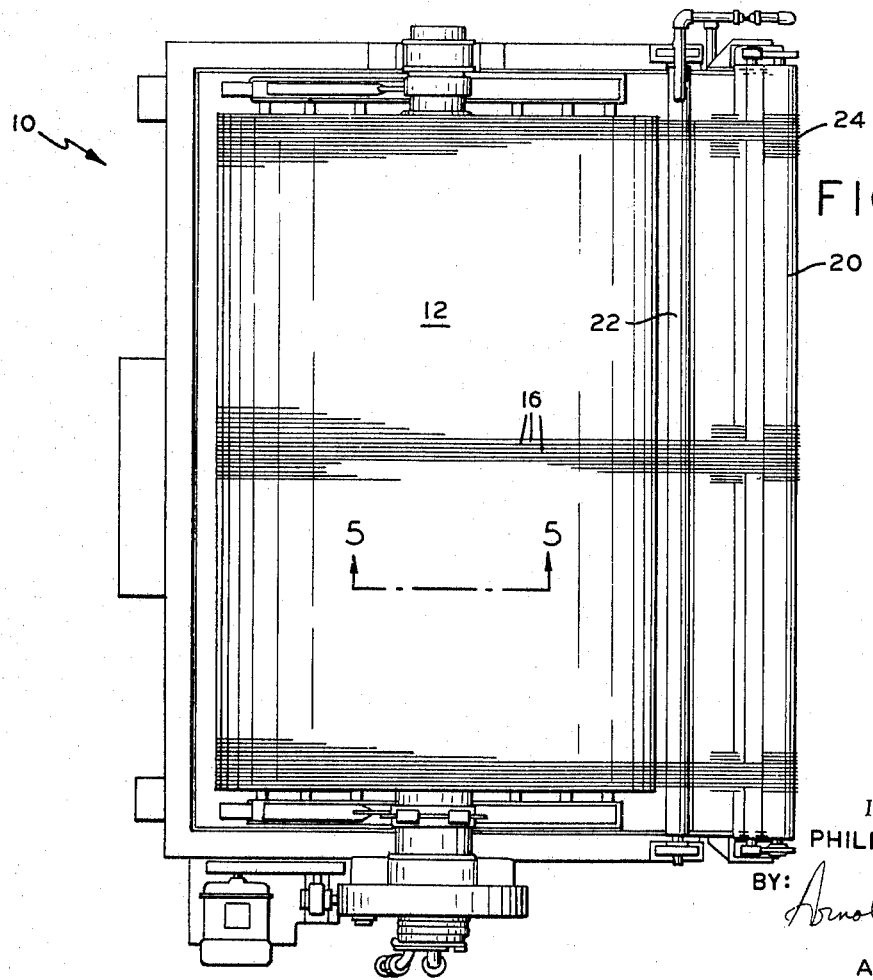
INVENTOR.
PHILIP EVANS
BY: Arnold Grant
ATTORNEY.

Dec. 23, 1969  P. EVANS  3,485,366
FILTER AND METHOD OF FILTERING
Filed Aug. 29, 1967  3 Sheets-Sheet 2

INVENTOR.
PHILIP EVANS
BY
ATTORNEY.

INVENTOR.
PHILIP EVANS
BY
ATTORNEY.

United States Patent Office 3,485,366
Patented Dec. 23, 1969

3,485,366
FILTER AND METHOD OF FILTERING
Philip Evans, London, England, assignor to Dorr-Oliver Incorporated, Stamford, Conn., a corporation of Delaware
Filed Aug. 29, 1967, Ser. No. 664,157
Int. Cl. B01d 33/36, 33/06
U.S. Cl. 210—77
15 Claims

ABSTRACT OF THE DISCLOSURE

A drum filter having circumferential ribs and a deformable filter medium which is gathered into the space between the ribs to form alternating ridges and furrows. A string or ribbon discharge, which may be woven of porous filter material, is located in the bottom of the furrow and serves to discharge the formed cake from the furrow.

---

One of the most recurrent problems in the design and specification of drum filters is that of available filter area versus over-all unit size. Heretofore filter area has been a direct function of the circumference and the axial length of the drum and thus once the filter capacity required for a specific application has been determined design energies are directed to fixing the relative dimensions of the unit. The dimensioning of filter units has, however, become a particularly complex subject in recent years as the demands of industry have required units having increasingly larger filter capacities. In many applications the economics of scale, which were usually recognized by increasing the available filter area and hence the size of the unit, diminished as the drum became unwieldly and expensive to construct, operate and maintain. There has thus existed in the art the problem of how to increase the available filter area of a filter unit without increasing the circumference and/or the length of the drum.

Applicant addressed himself to this problem and as a first aspect of his solution there is provided a filter, comprising a movable, porous filter surface formed in a number of alternate parallel ridges and furrows; means for applying a suspension to be filtered to a portion of said surface passing through a filtering region, elongated discharge means located in said furrows in the filtering region, means for drawing the discharge means out of said furrows to remove filter cake from said surface in a cake discharge region, and means for guiding the elongated discharge means back into said furrows before said surface reaches said filtering region.

According to a second aspect of his invention there is provided a method of filtering which comprises providing a moving porous filter surface having alternate furrows and ridges extending in the direction of motion of the surface and discharge means substantially below the level of the ridges; forming a cake on the filter surface by moving the filter surface through a liquid suspension to be filtered until the cake overlies the discharge means and substantially fills the furrows; moving the surface out of the liquid; and, thereafter drawing the discharge means out of the furrows to discharge the cake from the furrows.

A filter drum having a surface in the suggested form of a series of alternate parallel ridges and furrows enables more cake to be accumulated on each pass through the filtration zone than on an equivalently dimensioned drum with a non-furrowed surface. In fact, subsequent analysis by applicant has revealed that the optimum furrow dimensions provide three to four times as much filter area, and thus three to four times as much cake capacity, as the filter surface of an equally dimensional drum.

Although many alternate arrangements are possible, the preferred embodiment of applicant's invention has circumferentially disposed spaced ribs extending outwardly from the drum surface. The filter cloth, is stretched over, and gathered between the extending ribs to form alternating ridges and furrows; the cloth being retained in position by circumferentially extending securing strings or wires. As the discharge means applicant prefers elongated, porous strings or a porous ribbon, which can be washed and have the added advantage of becoming part of rather than decreasing the available filter area.

It is therefore an object of the present invention to increase the available filter area of a drum filter without increasing the diameter or axial length of the drum.

It is another object of the present invention to provide a drum filter having a filter surface with an alternating series of circumferential ridges and furrows.

It is still another object of the present invention to provide porous elongated discharge means in each of the furrows of a grooved surface drum filter.

It is yet another object of the present invention to provide a drum filter having a series of radially extending ribs and a layer of deformable filter medium material supported on said ribs and gathered inwardly between said ribs to form ridges and furrows.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

FIGURE 1 is a side elevational view of a drum filter incorporating the present invention;

FIGURE 2 is a plan view, with parts removed for clarity of showing of the drum filter of FIGURE 1;

Figure 6:
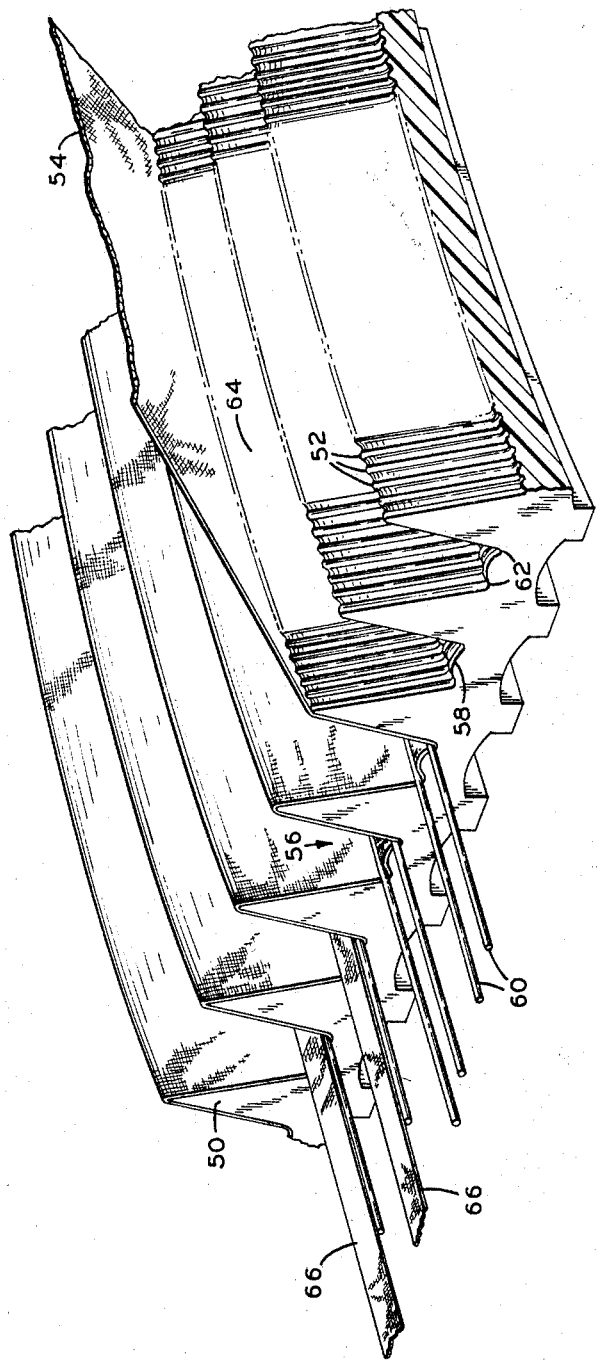
FIGURE 6 is a perspective view of another embodiment of the filter surface, showing, schematically, the construction of the filter surface.

Referring now to FIGURES 1 and 2 there is shown a drum filter 10 incorporating the present invention and having a drum 12, a filter vat 14, cake discharge ribbons or strings 16 and a cake receiving tank 18. It should be understood, at this juncture, that either strings or ribbons may be used as the cake discharge means, strings being illustratively shown in the embodiment of FIGURES 3 and 4 and ribbons being illustratively shown in the embodiment of FIGURE 6. Each of the cake discharge means 16 is positioned about the periphery of the drum 12, circumnavigating the available filter surface, from the take-off position, at a point tangent with grooved roller 20, to the return position, adjacent return roller 22. A discharge comb 24, positioned intermediate the drum 12 and the take-off roller 20, detaches the accumulated cake from the discharge means and deposits it in receiving tank 18. The discharge means is then passed over a cake removal knife 26 and through a wash station 28 to remove any remaining cake before it is returned to the drum through grooved roller 28 and return roller 22.

Figure 3:
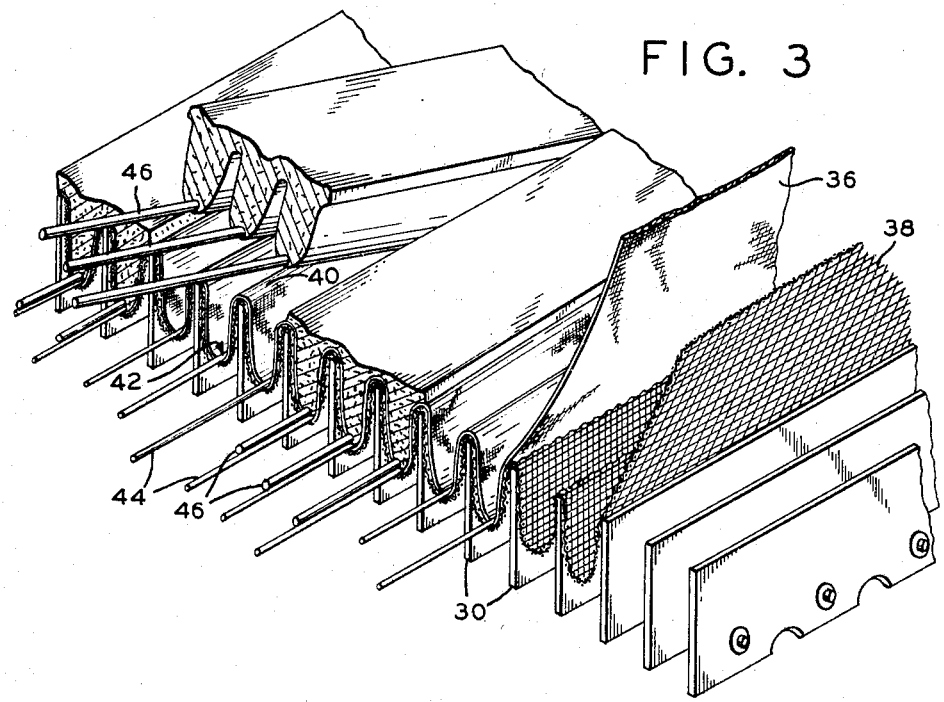
FIGURE 3 is a perspective view of one embodiment of the filter surface, showing schematically, the build-up of cake on the filter surface, the removal of the cake and the construction of the filter surfaces.
Figure 4:
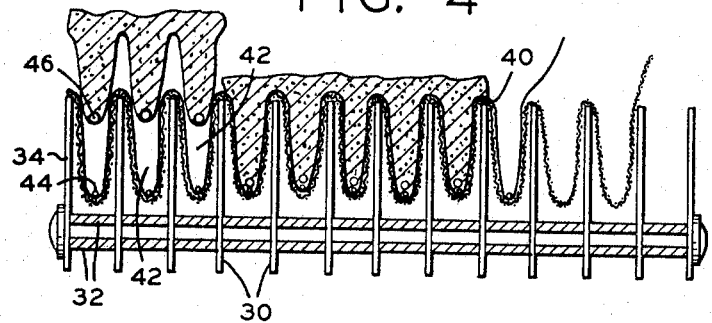
FIGURE 4 is a sectional view of one embodiment of the filter surface, showing, schematically, the take-off of filter cake, the build-up of the filter cake and the construction of the filter surface.
Figure 5:
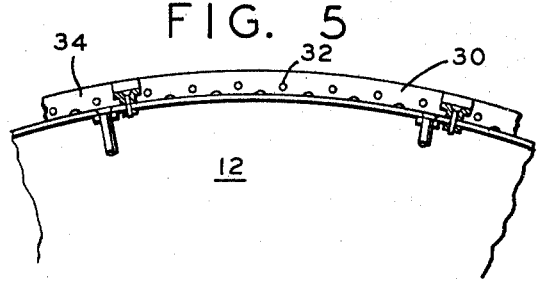
FIGURE 5 is a sectional view of part of the filter drum taken along the line 5—5 of FIGURE 2.

Referring now to FIGURES 3–5 one embodiment of the filter surface will be described in detail. The filter drum 12 has a series of circumferentially disposed, spaced ribs 30 extending outwardly from the drum surface and connected thereto by means of tie rods 32 and end plates 34. A filter cloth 36, preferably supported by a drainage screen 38, is positioned over and between the ribs 34 to form ridges 40 and cake receiving furrows 42. The filter cloth is drawn down, into the space between the ribs, and is secured in position by circumferentially extending wire or cord windings 44. The discharge means, shown in this embodiment to be elongated, porous strings 46, are then positioned in the furrows above the securing windings 44. Although, in this particular embodiment there is only one discharge string for each furrow it should be readily apparent that more than one such string can be accommodated.

Applicant has found that the optimum spacing between adjacent ridges 40 is equal to or less than the depth of each furrow, preferably less than or equal to half the depth of each furrow. Greatest capacity with optimum furrow width is realized when the two opposing sides of the forming cake, in any particular furrow, meet before the expiration of the cake pick-up period. While increasing the furrow depth proportionally increases the effective filter area applicant has observed that once the available filter surface is increased beyond four times the area of a cylindrical, unfurrowed, filter surface with the same diameter there is excessive wrinkling of the filter medium and difficulty in removing the filter cake.

In applicant's second embodiment of the filter surface (FIGURE 6), the circumferentially disposed spaced ribs 50 are wedge-shaped and have axially extending grooves 52 to receive separated filtrate. The filter cloth 54 is stretched over the ribs and is received in the furrows 56, being held in position on the base of the decking 58 between adjacent ribs, by circumferentially extending cloth securing strings or wires 60. A series of circumferential grooves 62, intermediately disposed between the rib wall 64 and the furrow base 58, receives the cloth securing strings 60 and retains them in position. The cake discharge means in this particular embodiment is a flexible porous ribbon 66 which rests on the base of the furrow while the cake is forming.

Thus when the furrows leave the filter vat 14, the discharge means are covered with a layer of cake which is several times the thickness normally possible upon a non-furrowed filter surface. In addition, the cake can be readily removed from the filter with less chance of being cut by the discharge means and left adhering to the filter surface. Since circular windings are used to hold the filter medium in position, reverse air blow, e.g., applied by an automatic valve at an axial end of the drum, can be used to aid the discharge process. A normal string discharge filter, on the other hand, must work without an air blow discharge to remove a thin cake where resistance to cutting or slitting is most needed, i.e., along the line of each embedded string.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and equivalency of the claims are, therefore, intended to be embraced by those claims.

What is claimed is:

1. A filter, comprising a movable, porous filter surface formed in a number of alternate parallel ridges and furrows, means for applying a suspension to be filtered to a portion of said surface passing through a filtering region, elongated discharge means located in said furrows in the filtering region, means for drawing the discharge means out of said furrows to remove filter cake from said surface in a cake discharge region, and means for guiding the elongated discharge means back into said furrows before said surface reaches said filtering region.

2. The filter defined in claim 1 in which said surface is supported on a rotating drum and in which said furrows and ridges run circumferentially about the drum.

3. The filter defined in claim 2 in which said drum is provided with a series of circumferential ribs spaced axially of said drum, and a layer of deformable filter medium material is supported on said ribs and gathered inwardly between said ribs to form said ridges and furrows.

4. The filter defined in claim 3 in which said filter medium material is gathered inwardly by a wire or cord wiring.

5. The filter defined in claim 2 in which said drum is provided with a series of circumferential ribs spaced axially of said drum, with a furrowed porous filter medium support resting on said ribs, the furrows of which extend circumferentially between said ribs, a layer of deformable filter medium material supported on said medium support, and a winding gathering said medium inwardly into the furrows of the medium support.

6. The filter defined in claim 1 in which said discharge means comprise strings in the furrows located in the lower portion of said furrows.

7. The filter defined in claim 1 in which said discharge means comprise ribbons in the furrows.

8. The invention defined in claim 7, in which said ribbons are of porous filter material.

9. The filter defined in claim 1 in which said furrows have a depth equal to or more than the distance between ridge crests.

10. The invention defined in claim 2 in which said guide means consist of circumferentially grooved guide rolls to receive and guide the discharge strings or ribbons.

11. The filter defined in claim 2 in which said filter surface is provided by a flexible deformable filter web engaged by said ridges on the underside and by fastening means acting on the bottom portion of the furrows to hold them in place and in which said discharge means are narrow endless flexible members, guides for guiding said narrow endless members into the lower portion of the furrows in the filtering region, and means for continuously drawing said flexible members out of said furrows to remove the filter cake from said web at a cake discharge region beyond the filtering region.

12. The filter defined in claim 11 in which said fastening means consists of wire or cord windings in the bottom of the furrows of the web.

13. The filter defined in claim 11 in which spaced division strips extend across said support and under furrows of the web to prevent passage of fluids longitudinally of said furrows.

14. The invention as defined in claim 13 in which the furrows are of greater depth than width and in which the filtering action in said liquid is continued until the buildup of cake on one side of the furrow is sufficient to join with the buildup of cake on the opposite side substantially to fill the furrow.

15. The method of filtering which comprises providing a moving porous filter surface having furrows and ridges in the porous surface extending in the direction of movement of the surface and discharge means substantially below the level of said ridges; forming a cake on the filter surface while moving it through a liquid suspension to be filtered, until the buildup of cake buries the discharge means and substantially fills the furrows; moving the surface out of the liquid; and, thereafter drawing the discharge means out of the furrows to discharge the cake from the furrows.

References Cited

UNITED STATES PATENTS

| | | | |
|---|---|---|---|
| 2,332,917 | 10/1943 | Jordan et al. | 210—393 X |
| 2,461,824 | 2/1949 | Komline | 210—401 |
| 3,275,154 | 9/1966 | Fritz | 210—396 X |
| 3,389,031 | 6/1968 | Rosaen et al. | 210—493 X |

REUBEN FRIEDMAN, Primary Examiner

JOHN W. ADEE, Assistant Examiner

U.S. Cl. X.R.

210—79, 380, 393